(12) United States Patent
Vrcelj et al.

(10) Patent No.: US 7,623,607 B2
(45) Date of Patent: Nov. 24, 2009

(54) METHODS AND APPARATUS FOR DETERMINING TIMING IN A WIRELESS COMMUNICATION SYSTEM

(75) Inventors: Bojan Vrcelj, San Diego, CA (US); Fuyun Ling, San Diego, CA (US); Michael Mao Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 644 days.

(21) Appl. No.: 11/264,532

(22) Filed: Oct. 31, 2005

(65) Prior Publication Data
US 2007/0098125 A1  May 3, 2007

(51) Int. Cl.
*H04L 7/00* (2006.01)
(52) U.S. Cl. ...................................... 375/355
(58) Field of Classification Search ........... 375/354, 375/355, 357, 369, 372, 373, 374; 370/395.62, 370/507; 455/265; 702/89; 713/375, 400
See application file for complete search history.

(56) References Cited

U.S. PATENT DOCUMENTS 6,498,928 B1 * 12/2002 Hiramatsu ............... 455/278.1
6,885,712 B1   4/2005 Celebi 2003/0058962 A1 * 3/2003 Baldwin .................. 375/316
2005/0180533 A1 * 8/2005 Hamman .................. 375/348

FOREIGN PATENT DOCUMENTS

| GB | 2 365 714 A1 | 2/2002 |
| WO | 97/07620 A1 | 2/1997 |
| WO | 2005/050865 A1 | 6/2005 |
| WO | 2006/099240 A1 | 9/2006 |

OTHER PUBLICATIONS

International Search Report- PCT/US06/060413, International Searching Authority - European Patent Office, Jun. 4, 2007.
Written Opinion - PCT/US06/060413, International Searching Authority - European Patent Office, Jun. 4, 2007.

* cited by examiner

*Primary Examiner*—Sam K Ahn
(74) *Attorney, Agent, or Firm*—Gerald P. Joyce, III

(57) ABSTRACT

Methods and apparatus for setting timing of sampling of one or more symbols. The disclosed methods account for at least three types of effective interference (EI) and are used to set the timing of a sampling window for sampling received symbols. The methods includes setting timing based on determining an energy density function accounting for both static and dynamic EI, determining the minimum of a total energy profile and sliding the sampling window to ensure that the minimum point is at a predetermined point, and determining and using a composite energy profile accounting for short term and long term fading effects. The disclosed apparatus include a transceiver employing one or more of the disclosed methods for setting timing when receiving the symbols.

12 Claims, 15 Drawing Sheets

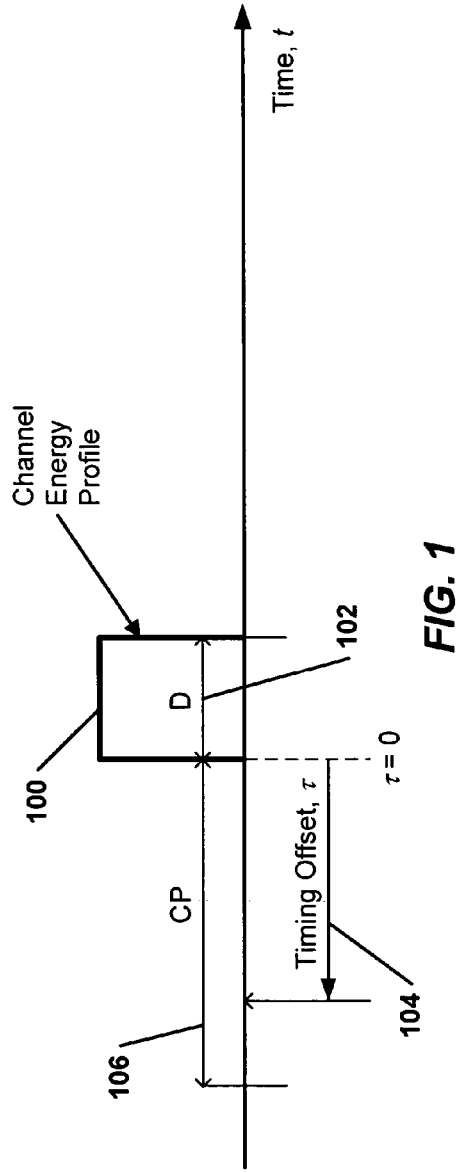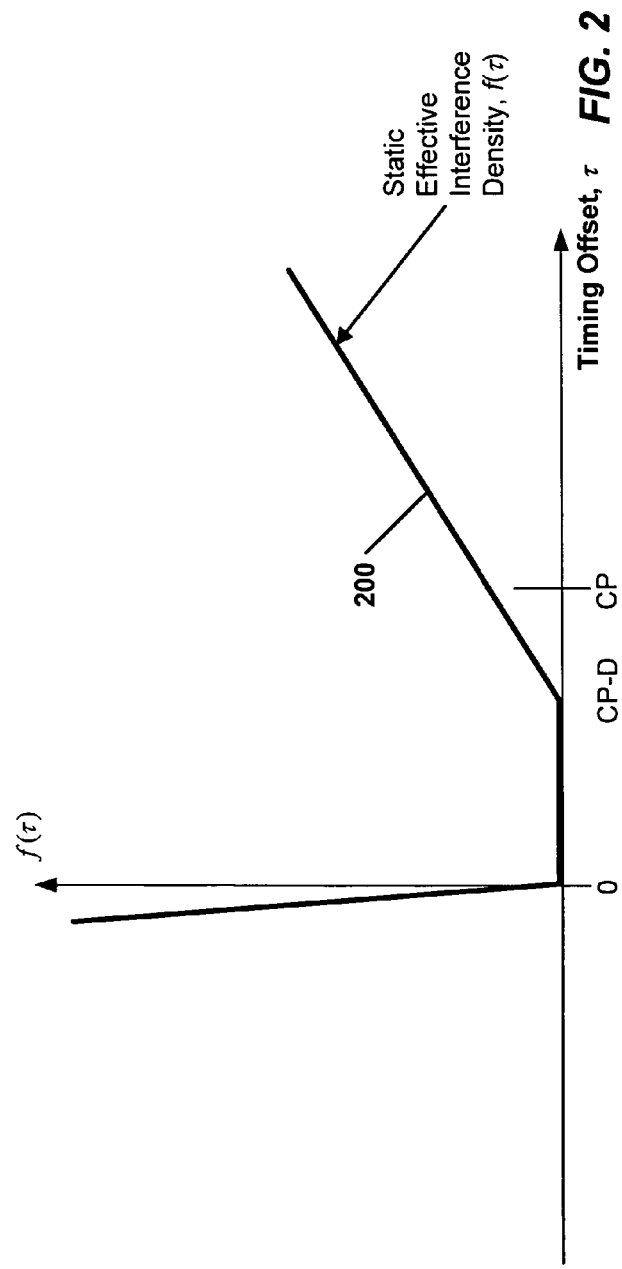

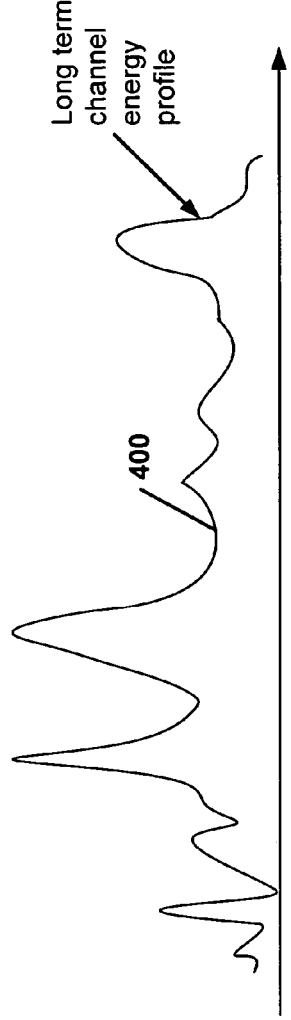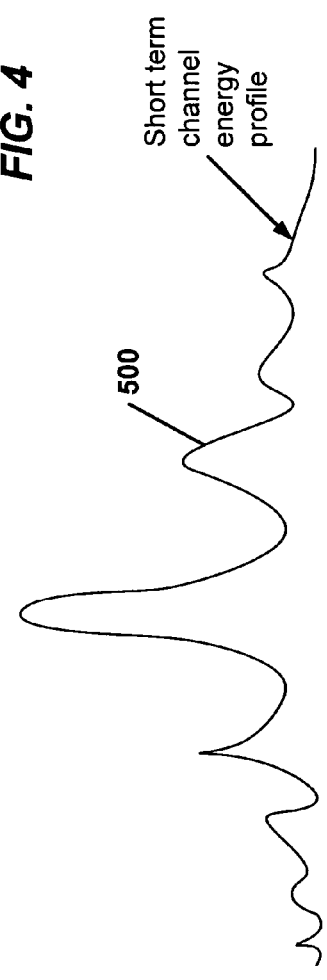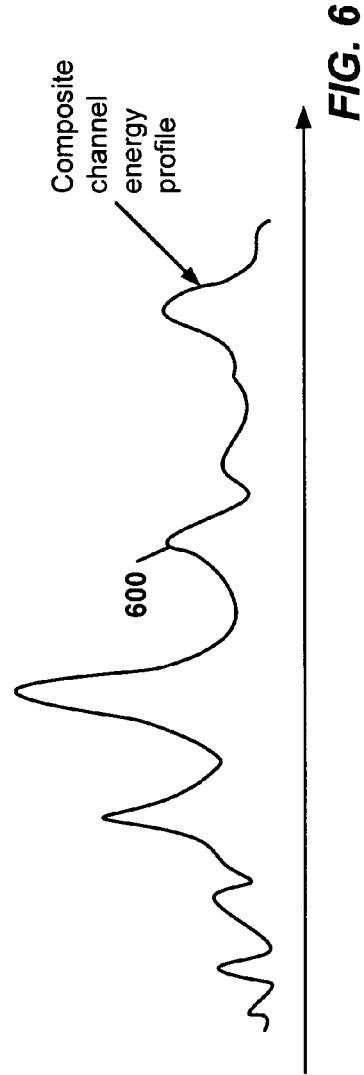

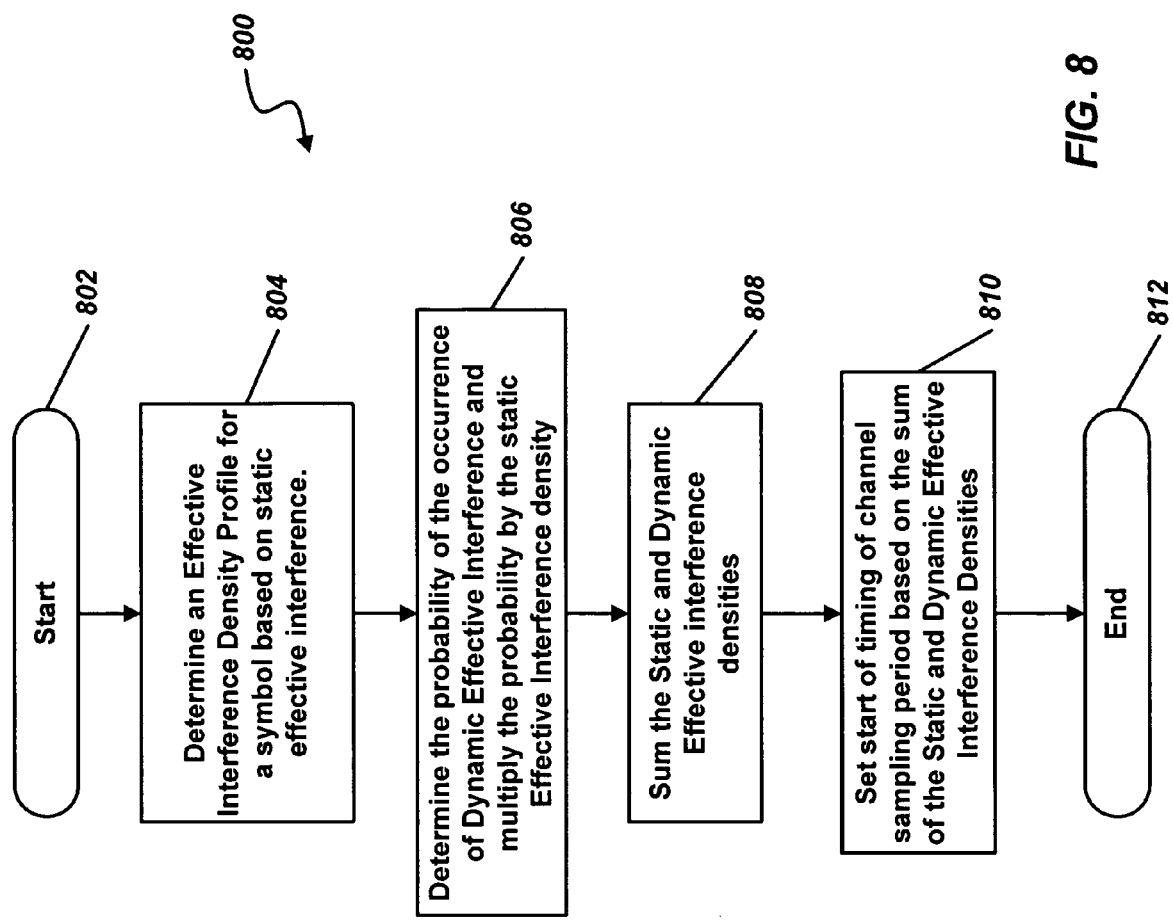

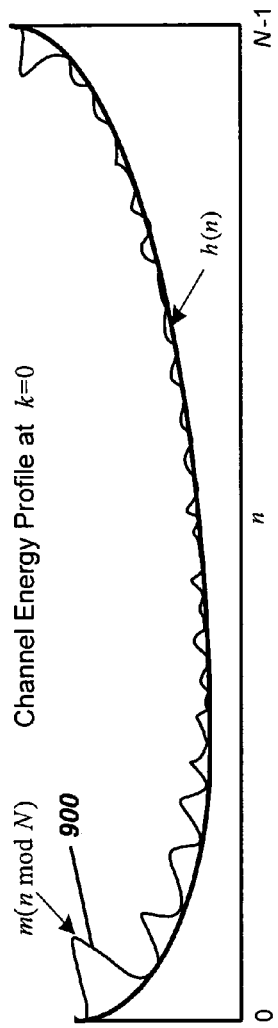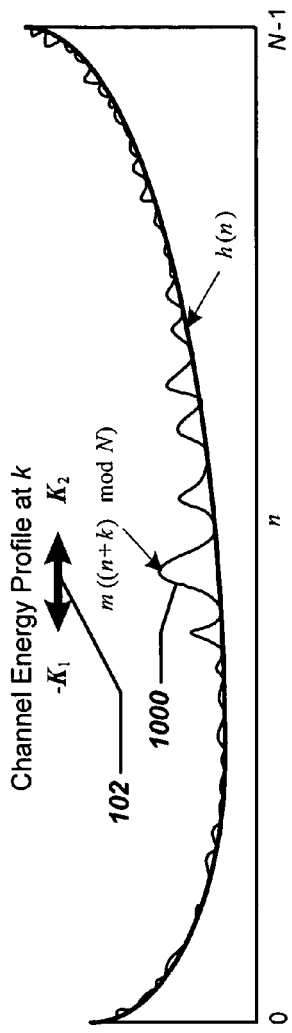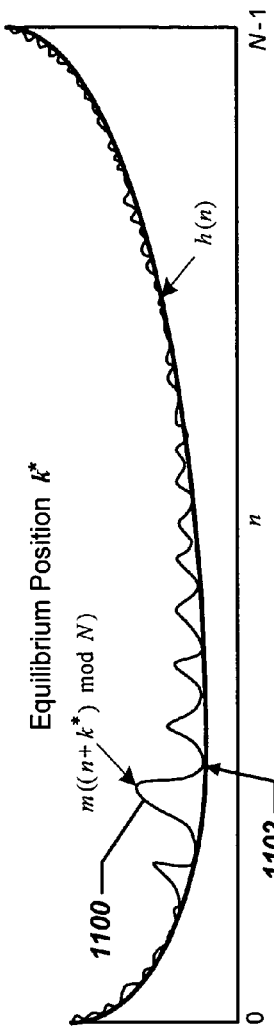

METHODS AND APPARATUS FOR DETERMINING TIMING IN A WIRELESS COMMUNICATION SYSTEM

BACKGROUND

1. Field

The present disclosure relates generally to determining timing in a wireless communication system and, more specifically to methods and apparatus for determining timing in a transceiver of a wireless communication system to set the start of a sampling period.

2. Background

Certain types of communication systems such as those using Orthogonal Frequency Division Multiplexing (OFDM), for example, are highly sensitive to synchronization errors such as timing error and frequency error. In order for these types of systems to work properly, the transceiver and the transmitter have to be synchronized, which includes timing and frequency synchronization. Ideally, synchronization and timing in a transceiver should follow the transmitter. In OFDM systems, for example, timing synchronization, in particular, involves finding the timing of the beginning of each OFDM symbol. Unless the correct timing is known, the transceiver cannot remove cyclic prefixes occurring between symbols at the right timing instant of the symbol and correctly separate individual symbols before computing the Fast Fourier Transformation (FFT) of the sample for demodulating the symbol.

Currently, standard techniques for timing synchronization in wireless communication systems using protocols such as OFDM are not known. Timing synchronization is typically performed on an ad hoc basis. In a channel having 1024 samples, for example, when performing timing synchronization, the start of channel or symbol must be found. In some cases, it is known to look at the rate or differential and then set the start where symbol power starts increasing at some predetermined rate. Some arbitrary back off or offset is then set from that point to ensure that the entire symbol is received in the set time period. Problems with this methodology, in particular, is that timing demodulation might fail if a subsequent symbol appears early during the set sampling period such as in cases where multipath transmission can cause a new symbol to occur in the same timing window. That is, if the subsequent channel appears early, the timing moves because of clock timing errors.

Another known approach for setting symbol timing is to position the symbol approximately in the middle of the sampling window. This is problematic, however, because Intersymbol Interference (ISI) as well as inter-carrier interference (ICI) may occur at either end of the timing window. These two types of interference together can be characterized as "effective interference" (EI). Thus, this approach also may yield timing demodulation errors.

Accordingly, a goal of timing tracking in a system such as an OFDM system is to find the optimum sampling start position of a sampling window for the next OFDM symbol or channel given the current OFDM symbol or channel. The sampling position should be chosen such that intersymbol interference (ISI) as well as intercarrier interference (ICI), which are termed as the "effective interference" (EI), caused by the existing channel profile is suppressed and the signal-to-noise ratio (SNR) is correspondingly enhanced. Sources of EI can be classified into a number of types. The first type is static EI that, given the current channel profile, is a deterministic EI determined by the OFDM symbol structure, e.g., the length of a cyclic prefix. In a dynamic environment, however, channel time variation (new arrival paths that may appear in the future) and system timing error (e.g., sleep timing error) may also introduce EI. This EI can be typified as a dynamic EI that is random in nature and best described by probabilistic models. Another type of EI arises from channel fading, where faded channel taps may also affect the timing decision causing EI.

SUMMARY

Methods and apparatus are presently disclosed to provide accurate setting of start of timing by accounting for various types of intersymbol interference. In one example, a method is disclosed . . . [TO BE COMPLETED AFTER FINAL APPROVAL OF CLAIMS]

BRIEF DESCRIPTION OF THE DRAWINGS

FIG. 1 is a plot of an exemplary energy density function of a symbol.

FIG. 2 is a plot of an exemplary static effective interference (EI) density function $f(\tau)$ 200 defined as a function of timing offset.

FIG. 4 is a plot showing an example of a long term channel energy profile.

FIG. 5 is a plot showing an example of a short term channel energy profile.

FIG. 6 is a plot of a composite channel energy profile of the sum of the long term and short term energy profiles illustrated respectively in FIGS. 4 and 5.

FIG. 8 is a flow diagram of an exemplary method for determining a starting timing position with a calculated energy density profile.

FIG. 9 illustrates a plot of a channel energy profile according to an example.

FIG. 10 illustrates a plot of a channel energy profile at a particular timing setting of sampling window according to an example.

FIG. 11 illustrates a plot of a channel energy profile at a particular timing window setting such that the start corresponds to a minimum point according to an example.

DETAILED DESCRIPTION

The present application discloses methods and apparatus for determining timing of a symbol in a wireless system that minimizes the three types of effective interference (EI) discussed above. By setting timing in a transceiver or a similar device to ensure minimization of the total effective interference (EI) (i.e., minimization of ISI and ICI and maximization of signal energy), performance of the transceiver to decode and demodulate is better optimized.

Specifically, the present application discloses a methodology for determining the timing of a timing window taking into account at least the three different sources of effective interference (EI), namely static EI, dynamic EI and EI due to faded channel taps. This accounting may be accomplished by analytically deriving a composite EI function that combines the three types of EI into an effective EI density function.

The static EI is determined from the symbol structure of the particular wireless system. For example, in an OFDM system, the symbol structure has a particular form including a cyclic prefix that guards against interference between two consecutive symbols. Assuming a static or unchanging EI, the EI may then be determined due to the deterministic nature of the OFDM symbol structure given the channel profile. As an illustration, FIG. 1 shows a theoretical energy density function 100 of a symbol received beginning at time t=0. The duration of the density function is the delay spread D (102) arising due to multipath transmission of the signal. Prior to the symbol, a timing offset τ (104) is defined to guard against interference (EI). The timing offset τ extends into the cyclic prefix CP time period 106 as illustrated.

FIG. 2 illustrates a typical static EI density function $f(\tau)$ 200 defined as a function of timing offset τ, i.e., EI per unit signal energy. As may be seen in this figure, if the timing offset τ is set a time of the start of the cycle prefix CP, there is an amount of EI energy present. However, when the timing offset τ is set at the difference of the cyclic prefix and the delay spread (e.g., CP-D), the amount of EI energy is reduced to zero (0). Dynamic EI that is introduced by a channel's dynamic behavior may be determined by representation with a channel dynamic probability model. That is, the dynamic EI may be determined by calculating the probability of how much EI will occur due to the dynamic change of channel, i.e., the appearing and disappearing of channel taps. The probability model may be based on a Poisson probability model, or a birth and death model, as examples, or any other probability model dealing with counts or occurrences of events over a period of time.

Figure 3:
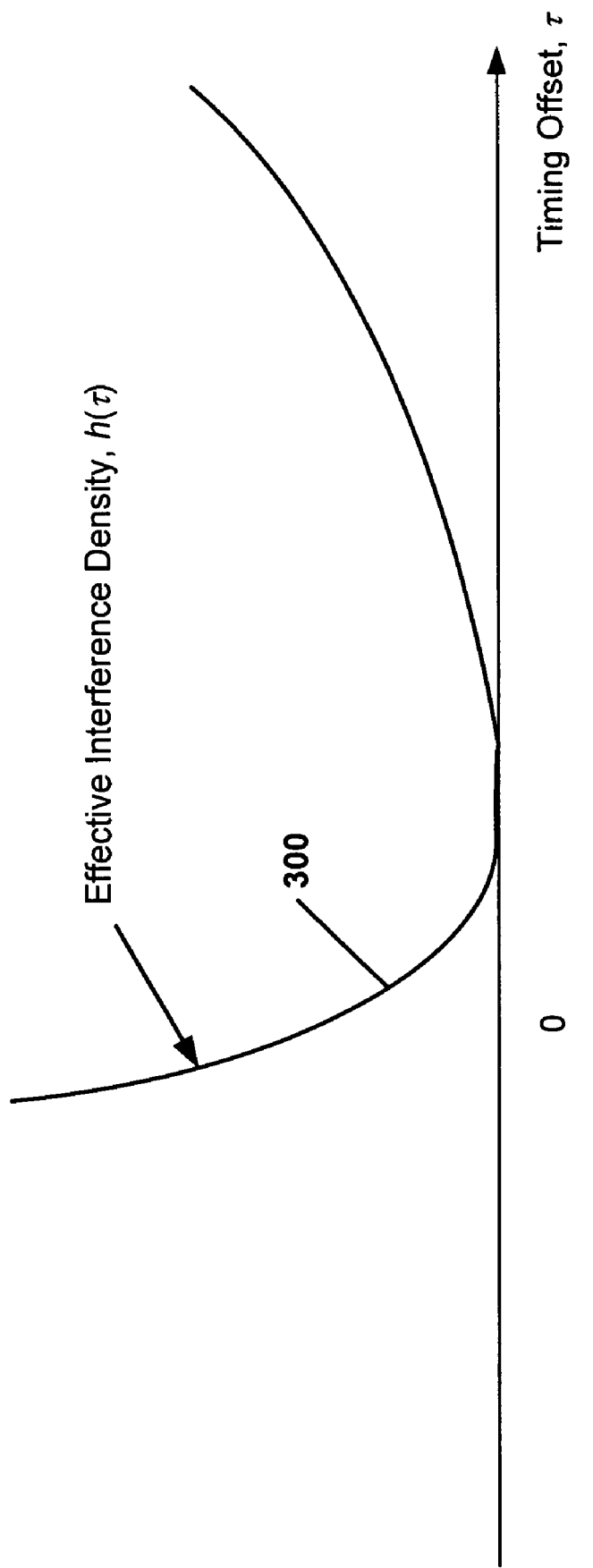
FIG. 3 is an exemplary plot of an effective interference density function having static and dynamic effective interference densities combined.

The static and dynamic combined EI density function h(τ) can be represented as:

$$h(\tau) = (P(\tau)+1) f(\tau) \quad (1)$$

where P(τ) is the probability that a new channel tap (ray) may appear at an offset τ and f (τ) is the static effective interference (EI) density. FIG. 3 shows an exemplary plot of the effective interference density function 300 with the static and dynamic effective interference densities combined.

The third type of EI is that due to channel fading characteristics. This EI can be modeled by the channel energy distribution function, or long-term channel energy profile, $\overline{m}(t)$, 0<t<T and can be represented by the following equation:

$$I_{\overline{c}}(\delta) = \int_0^T h(\tau+\delta) \overline{m}(\tau) d\tau \quad (2)$$

where T is a maximum measurement time. As an illustration, an example of a long term channel energy profile 400 is shown in FIG. 4. Additionally, modeling EI due to channel fading accounts for the instantaneous EI, which is the EI caused by a current channel energy profile, or, short-term channel energy profile, $\tilde{m}(\tau)$, 0<t<T, and can be represented with the following equation:

$$I_c(\delta) = \int_0^T h(\tau+\delta) \tilde{m}(\tau) d\tau. \quad (3)$$

An example of such of a short term channel energy profile 500 is illustrated in FIG. 5

The combination of the long and short term energy profiles, which is the total EI due to channel fading, can thus be defined by the equation $$\begin{aligned} I(\delta) &= I_{\overline{c}}(\delta) + I_c(\delta) \quad (4)\\ &= \int_0^T h(\tau+\delta)(\overline{m}(\tau)+\tilde{m}(\tau)) d\tau \\ &= \int_0^T h(\tau+\delta) m(\tau) d\tau \end{aligned}$$

where $m(\tau) \square \overline{m}(\tau)+\tilde{m}(\tau)$ is called the composite channel energy profile, an example of which is illustrated by plot 600 in FIG. 6. The composite channel energy profile 600 is thus the sum of the long term and short term energy profiles 400 and 500 illustrated respectively in FIGS. 4 and 5.

Based on this effective EI density function and a composite channel energy profile (a combination of current channel energy profile and the long-term channel energy profile), the present disclosure in part relates to searching for a timing position $\hat{\delta}$ such that under this timing hypothesis the composite channel energy profile results in minimum total EI or maximum total SNR. This can be represented mathematically as:

$$\hat{\delta} = \arg \min_{\delta} I(\delta) \quad (5)$$

where the timing position $\hat{\delta}$ is thus the argument of the minimum of the total $I(\delta)$.

Accordingly, the optimal timing position represents a balance between instantaneous EI, dynamic EI, and the fading EI, or, in other words, an equilibrium among the three types of EIs discussed above.

Figure 7:
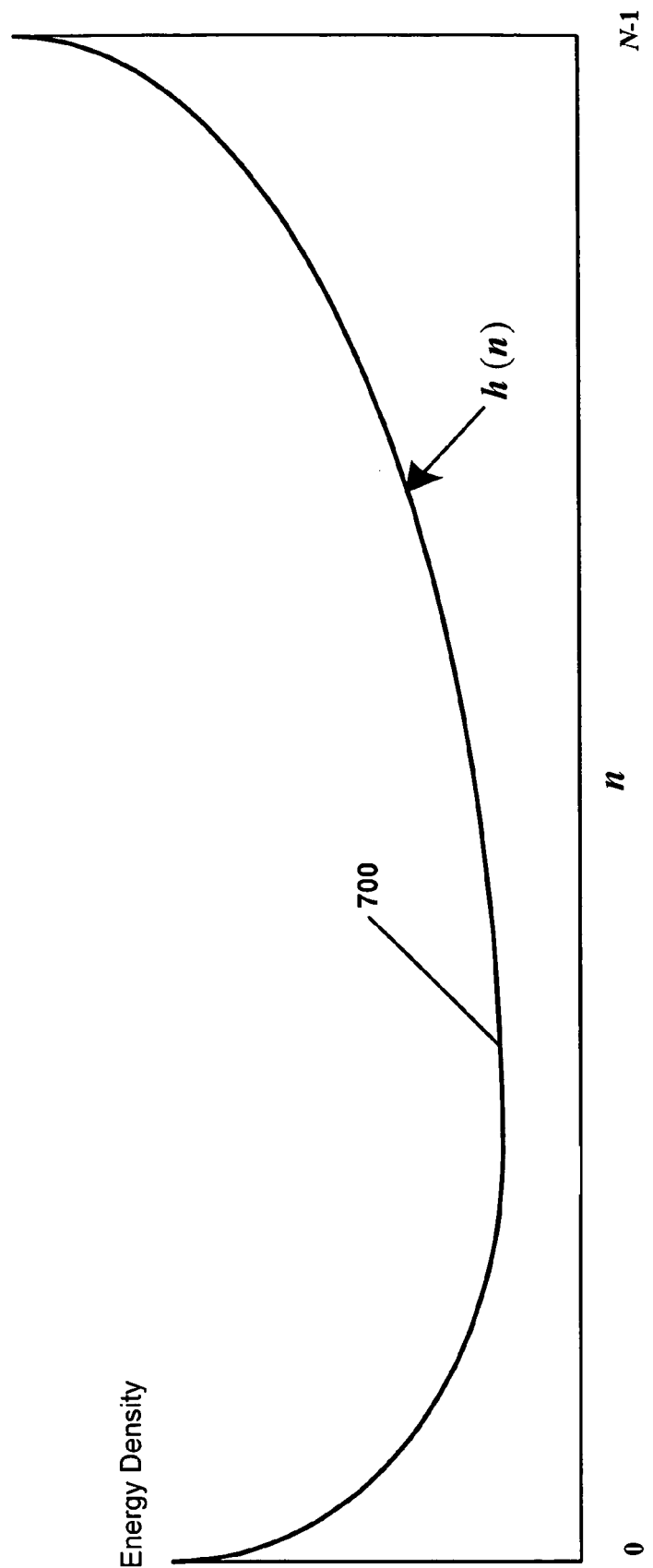
FIG. 7 is an exemplary plot representative of an effective ISI density function.

FIG. 7 illustrates a plot of a function 100, labeled also as h(n). This function 700 is representative of a typical, "real world" effective interference density function, as opposed to FIG. 3, which is a theoretical example. The abscissa of the plot of function 700 is the number of samples n in the channel estimation period. Here, the function 700 is shown over a channel estimation using a number n=N channel samples, where the N number of samples is much greater than a maximum channel or symbol length L or a multiple thereof, such as N>>2L. An example of a number that may be used for N is 2048 samples, but this number could be more or less dependent on the level or resolution desired. Additionally, an example of the maximum channel length could be L=768 and the cyclic prefix equal to a length of 512 samples.

Function 700 is the combination of static and dynamic EI energy densities. The static portion is determined based on the channel symbol profile, such as an OFDM symbol as an example, which was discussed previously. The dynamic portion of function 100 is determined using a probability function by multiplying the energy due to dynamic EI with a probability P. The probability P is a factor representative of how likely the dynamic EI energy will occur in the symbol in the present symbol based on the occurrence of dynamic EI in one or more preceding symbols. As mentioned previously, the probability P may be modeled by a Poisson probability model or any other suitable probability model effectively modeling the likelihood of a number of occurrences over a specified time period. By accounting for the dynamic EI, a more accurate model of the total EI may be garnered over merely accounting for the static EI. This alone will yield a more accurate determination for setting the start of a sampling channel. Once the static and dynamic energy densities are determined over a channel sampling period, the sum of these two energy densities then is used to determine the function 700. This function 700 may then be utilized to set a start of timing of the symbol based on this determined energy density profile.

FIG. 8 is a flow diagram of the method for determining a starting timing position with a calculated energy density profile described above. The process 800 starts at block 802 and proceeds to block 804 where an effective interference energy density profile for a symbol is determined based on static effective interference. Either subsequent to (or simultaneous with) probability P concerning the likelihood of dynamic EI is determined at block 806. The probability P is then multiplied by the dynamic EI energy density to achieve the effective dynamic EI energy density. Once the static and dynamic EI energy densities have been determined, these values are summed as indicated at block 808 to determine the total energy density profile (i.e., function h(n)). As described previously, this profile may then be used by a transceiver to set the start of timing of a channel sampling period as indicated in block 810. The process 800 ends as shown by block 812, but it is noted that process 800 is repeated for each new sampling period.

An estimated channel energy profile may be additionally defined and calculated to more accurately determine the total channel energy profile. This estimated channel energy profile, in concert with the above discussed function 700, may be used to derive total effective interference energy over a sampling period for received transmissions. The estimated channel energy profile may be calculated with the following expression:

$$m(n)=p(n)=\|c(n)\|^2 \text{ for } n=0, 1, \ldots, L, \ldots, N-1 \quad (6)$$

where m(n) or p(n) is the estimated channel energy profile; c(n) is the complex gain of the incoming signal at a particular sampling point n; and ||c(n)|| represents the mathematical operation of determining the magnitude of the complex gain. As indicated by equation (6) above, the estimated channel energy profile m(n) may be computed for each of the sample points from 0 to N−1.

It is noted that the above energy density profile h(n) and the estimated channel energy profile m(n) can be analogized to an "altitude" or "height" function and a "mass" function, respectively. Accordingly, the product of these two functions, which is used in determining the minimum of the total EI, is correspondingly analogous to potential energy (i.e., PE=mgh, which m is the mass, h the height, and known constant g, which is acceleration due to gravity). In determining the minimum or "equilibrium", the point of lowest "potential energy" is determined and used to set the timing, as this is likely the point prior to occurrence of the symbol to be sampled.

Given the above analogy to potential energy, the product of the estimated channel energy profile (or mass) m(n) and the EI energy density (or height) function h(n) will yield the EI energy (i.e., "potential energy") at a given sample n. The summation of the energy over each of the points n gives total energy for the entire sampling as indicated by the following equation:

$$\text{Total Potential}/EI \text{ Energy} = \sum_{n=0}^{N-1} m(n)h(n) \quad (7)$$

The above relationship of equation (7) can be utilized to determine the sampling point at which the minimum or "equilibrium" of the energy occurs for the purpose of further optimizing start timing. That is, the minimum is the point at which the channel energy profile has the minimum effective interference energy, or the mass object has the least potential energy, which is the most stable point. The minimum or equilibrium point k* may be determined using the following equation:

$$k^* = \operatorname*{argmin}_{k \in [-K_1, K_2]} \sum_{n=0}^{N-1} m((n+k) \bmod N) h(n) \quad (8)$$

where m((n+k) mod N) is the estimated composite channel energy profile function, and h(n) is the EI energy density. According to equation (8), the product of m(n) and h(n) is summed for all samples n within the sampling window. −$K_1$ and $K_2$ are pre and postfix lengths for the value k. in determining the argument of the minimum (arg min) of the summation. The prefix and postfix lengths −$K_1$, $K_2$ for k may be set at bounds N-L and N, respectively, but may be any values within those bounds sufficient to account for enough samples to accurately determine the equilibrium point. The calculated position k*, which is the minimum, is then considered the optimum timing position. The modulo operator (mod N) indicates that the operation is cyclic, up to a maximum N before repeating.

If the value of k* is positive, this indicates that the new timing should be adjusted to sample later than a current sampling timing. Thus, the sampling window would be shifted to the right or, in other words, delayed. On the other hand, a negative k* value indicates that the new timing shall be moved to k* samples earlier, advancing the sampling window. This delaying or advancing of the start of timing (i.e., sliding the timing window) affords a more robust and accurate method for setting the start of timing/

As an illustration, FIGS. 9-11 show plots of an exemplary channel energy profile respective to the EI energy density function h(n) at different "window" settings for various values of k. FIG. 9, in particular, illustrates a channel energy profile 900 at k=0, corresponding to the current timing position. FIG. 10 illustrates the energy profile 1000 at a particular timing setting of the "window," for a value of k that is bounded by the pre and postfix lengths $-K_1$, $K_2$ which are indicated general by the arrow 402, where $-K_1$ is prior or less than $K_2$. As discussed previously, if the determined minimum yields a value of k* that is negative, then the window is shifted to left to adjust the timing offset (i.e., an earlier sample) to ensure a start of timing that achieves the least EI. Conversely, a positive k value warrants shifting or delay to window to the right (i.e, a later sample), to ensure a start of timing that achieves the least EI. When a timing position is selected such that the value of k* is or approaches zero or a minimum number as determined by equation (3), the start of timing can be set so that the product of m(n) and h(n) is minimized. As illustrated in FIG. 11, the timing window is set such that the equilibrium or minimum point n (1102 in FIG. 11) of the channel energy profile 1100 where the minimum of h(n) occurs. This ensures the minimum total EI energy is occurring at the start of the timing for the symbol or channel.

Figure 12:
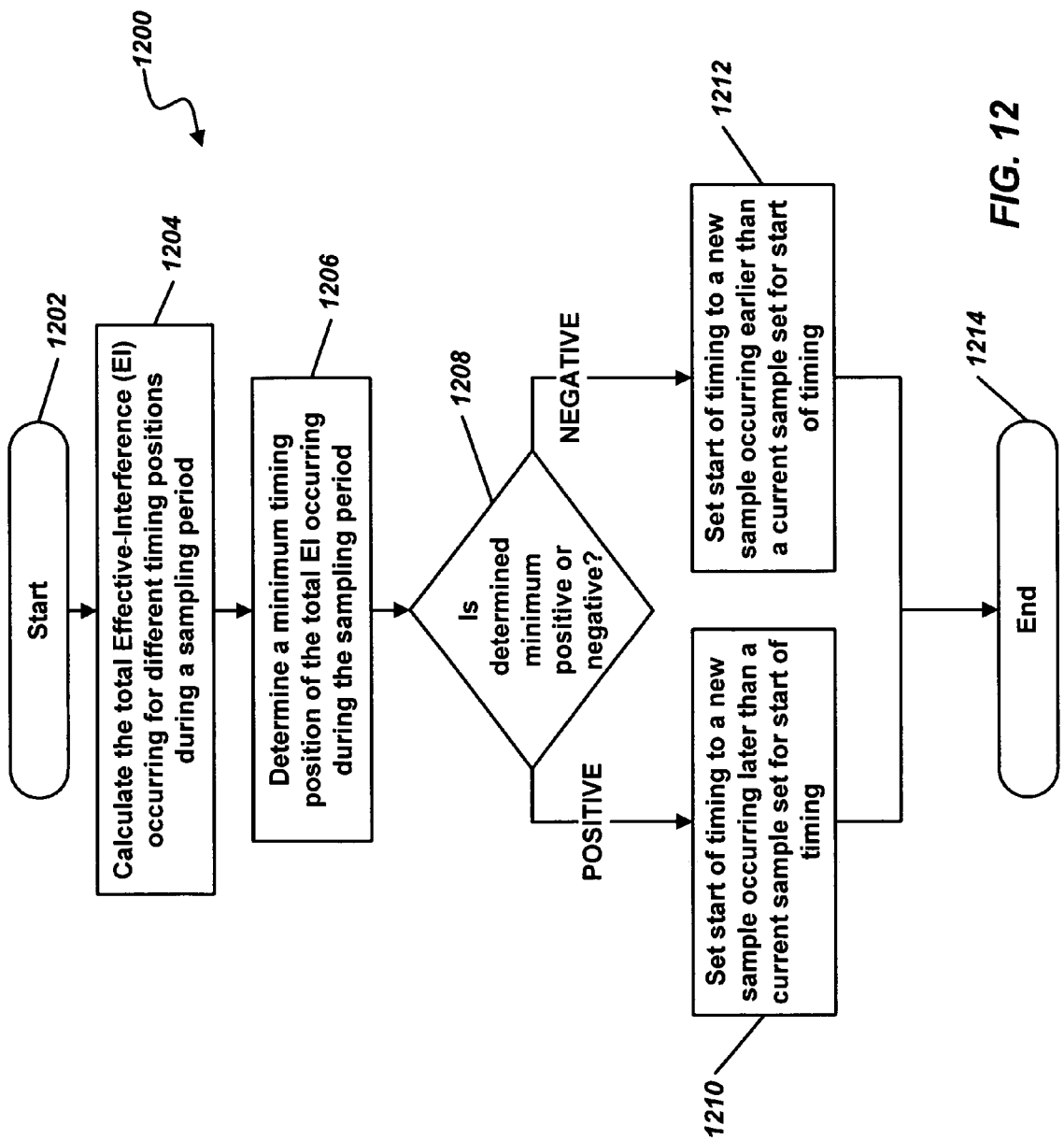
FIG. 12 illustrates a flow diagram of an exemplary method for determining a starting timing position with a calculated energy density profile.

FIG. 12 is a flow diagram of the process for finding the equilibrium point or minimum point as discussed above. As shown, the process 1200 starts at block 1202, proceeding then to block 1204. At block 1204, the total effective interference (EI) is calculated at different timing positions as occurring during a sampling period. This may be accomplished using equation (7) above. A minimum timing position of total EI is then determined as shown at block 1206. The minimum may be found by resort to equation (8) above. After the minimum is determined, flow proceeds to decision block 1208. If the determined minimum (i.e., k*) is positive, flow then proceed to block 1210 where the start of the timing is set to a new sample n occurring later than the sample currently set for the start of timing. Alternatively at block 1208, if the determined minimum k is negative, then the flow proceeds to block 1212 and the start of timing is set to a new sample n occurring earlier than the current sample set for the start of timing. It is noted that if k* is zero, then the start of timing remains the same as the previous sample, although this is not shown in the flow diagram of FIG. 12. After the processes of blocks 1210 or 1212, the process 1200 ends as shown by block 1214. It is noted, however, that process 1200 is repeated for each new sampling period.

Channel fading affects the dynamic portion of the EI, in particular. The current channel profile plus the average, long term channel profile equals the composite function, which is used to obtain the total EI. As discussed previously, the third type of EI due to channel fading may occur, leading to timing synchronization errors. In order to compensate for this type of introduced EI, the presently disclosed methodology also includes setting the start of timing by taking into account both short term fading, current or instantaneous characteristics, as well as long term fading characteristics. To account for both short and long term fading, a balance between the long term channel characteristics and the short term or instantaneous channel activity is achieved by determining a composite channel energy profile m(n) as defined by the following equation:

$$m(n)=\alpha \overline{m}(n)+\beta \hat{m}(n) \qquad (9)$$

where $\overline{m}(n)$ and $\hat{m}(n)$ are the long-term and short term channel energy profiles, respectively, which can be estimated using low-pass filtered estimated channel energy profiles $c_s(n)$ across symbols with effective bandwidths of $B_{slow}$ and $B_{fast}$, respectively, where $B_{slow} << B_{fast}$, and $\alpha$ and $\beta$ are first and second percentage weighting coefficients whose sum equals one (i.e., 100%). A "slow filter" is used to remove the effect of channel amplitude variation due to fading in order to obtain a long term channel characteristics estimate. The "fast filter" is used to reduce the channel estimation error. Typically, $\alpha=\beta$; i.e., both values are set at. 0.5 or 50% to equally account for slow and fast fading effects, but these values may be set differently to favor one of the fading effects over the other. It is noted that this composite energy profile as defined in equation (9) may be used for function m in equation (8) when determining the minimum or equilibrium point. Thus, the determined minimum calculated in equation (8) may account also for short and long term fading effects, to determine more accurately the timing starting position. The present equilibrium methodology thus can be tailored to help find a timing position to balance both an inertial force generated by $p_{slow}$ (representing the long term channel behavior) and a fast attack force created by $p_{fast}$ (representing the short term channel activity). Thus, by taking into account the effects on EI due to fading, a more accurate estimation of the start of timing may be obtained.

Figure 13:
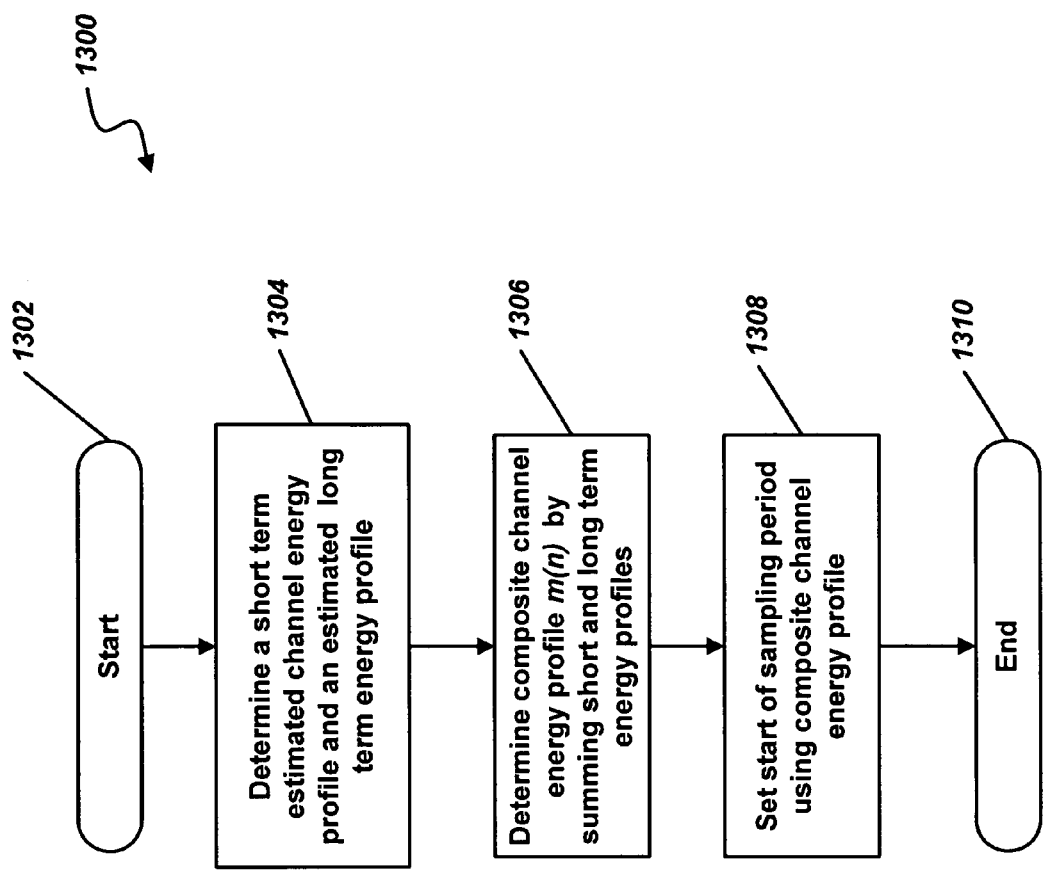
FIG. 13 illustrates a flow diagram of an exemplary method for determining a composite energy profile.

FIG. 13 illustrates a flow diagram of an exemplary method for determining the composite energy profile. In this diagram, a process 1300 first starts at block 1302. Flow proceeds to block 1304 where a determination is made of the short term estimated channel energy profile and long term energy profiles. This is accomplished by low-pass filtering the estimated channel energy profile p(n) to achieve the estimated composite channel energy profile. At block 1306, the composite channel energy profile is determined by summing the short and long term channel energy profiles, which may be weighted with variable $\alpha$ and $\beta$. Next, flow proceeds to block 1308 where the start of the sampling period is set using based on the determined composite channel energy profile. The process ends at block 1310, but it is noted that the process 1300 is repeated for each sampling period.

Figure 14:
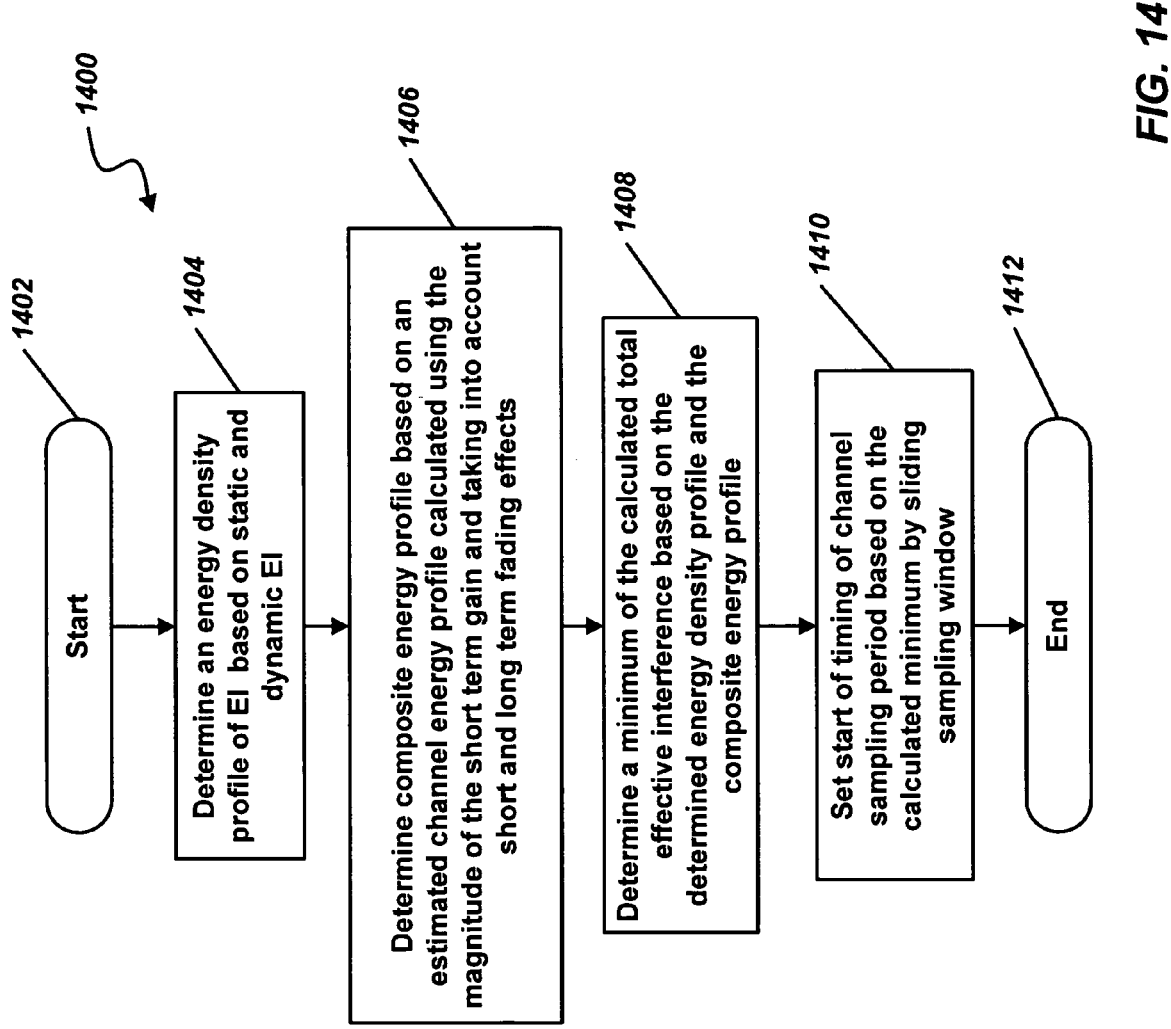
FIG. 14 illustrates a flow diagram of an exemplary method employing two or more of the methods of FIGS. 1-7.

The methods described in connection with FIGS. 7-13 above, may be employed together to achieve an even more accurate start timing estimation due to the cumulative effects of combining these methods. FIG. 14 is a flow diagram illustrating an exemplary method employing all of the above-described methods. As shown, the process 1400 for setting a start timing begins at block 1402. Flow proceeds to block 1404 where the total EI energy density profile is determined based on static and dynamic EI, similar to the method described in connection with FIG. 8. Either subsequent or concomitant to determining the energy density profile (i.e., h(n)), a composite energy profile is determined, which is similar to the method described in connection with FIG. 13. This part of the process is shown by block 1406 in sequence with block 1404, but alternatively the processes of blocks 1404 and 1406 could occur in parallel.

After determination of the energy density profile and the composite energy profile, a minimum of the total intersymbol interference is determined, such as by equation (8), discussed previously and discussed in connection with FIG. 12. This process of finding the minimum or "equilibrium" is indicated by block 1408. After the minimum is found, the start of timing of the channel sampling period is adjusted or slid to a timing setting based on the determined minimum as indicated at block 1410. Process 1400 ends at termination 1412 as indicated. It is noted, however, that the process 1400 is repeated for each timing period.

Figure 15:
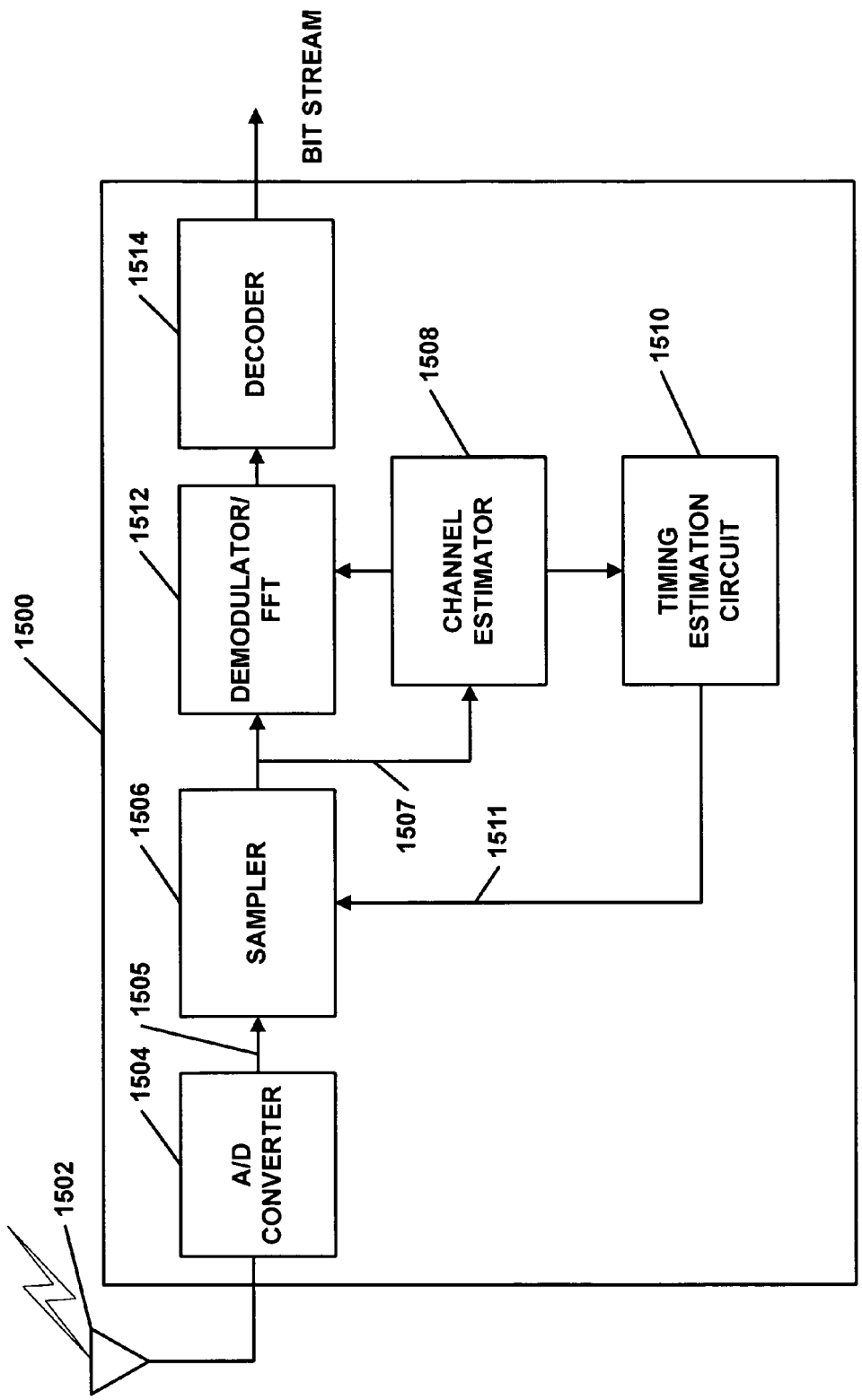
FIG. 15 illustrates a block diagram of an exemplary transceiver according to the present disclosure.

FIG. 15 is a block diagram of an exemplary transceiver 1500 that may employ any or all of the above-described methods for estimating the start of timing. As illustrated, the transceiver includes an antenna 1502 that receives a transmitted wireless signal. The antenna delivers the signal to an analog-to-digital (A/D) converter 1504 that converts the analog wireless signal to a digital signal 1505. A/D converter 1504 outputs the digital signal 1505 to a sampler 1506. Sampler 1506 is the portion of the transceiver 1500 that effects the actual timing window for sampling the subcarriers or bins within the signal 1505. The output of the sampler, which is the synchronized digital signal 1507, is input to both a channel estimator 1508 and a demodulator/FFT 1512. The channel estimator 1508 performs coherent detection, as an example, using pilot tones inserted by the transmitter (not shown) into the symbols of the digital signal. Estimator 1508 performs channel estimation that yields an impulse response and frequency response of each channel. These results 1509 are transmitted to a timing estimation circuit 1510 for calculation of a timing offset or the start of timing for sampling of the channel and to the demodulator/FFT 1512.

Timing estimation circuit 1510, in particular, performs one or more of the methods described previously in connection with FIGS. 7-14 to establish the correct timing synchronization of the sampler. Thus, circuit 1510 outputs timing data 1511 to the sampler 1506 for setting the timing of the sampling window of sampler 1506. It is noted that circuit 1510 may be implemented as hardware, software, or firmware within a transceiver apparatus, such as transceiver 1500. Additionally, in the case of a software implementation, the transceiver 1500 could include an integrated circuit, such as an Application Specific Integrated Circuit (ASIC) including or interfacing with a computer readable medium having instructions stored thereon, the stored instructions, when executed by a processor, cause the processor to perform the methods described above.

As shown in FIG. 15, the output of the sampler 1506 also feeds the signal 1507 to a demodulator 1512, for demodulating the signal 1507, which was modulated by the transmitter (not shown) according to one of a number of known techniques. After demodulation, the resultant demodulated signal 1513 is decoded by decoder 1514 and output as a serial bit stream for use by a mobile communication device in which the transceiver is housed, such as a mobile phone device or a personal data assistant, as examples.

Figure 16:
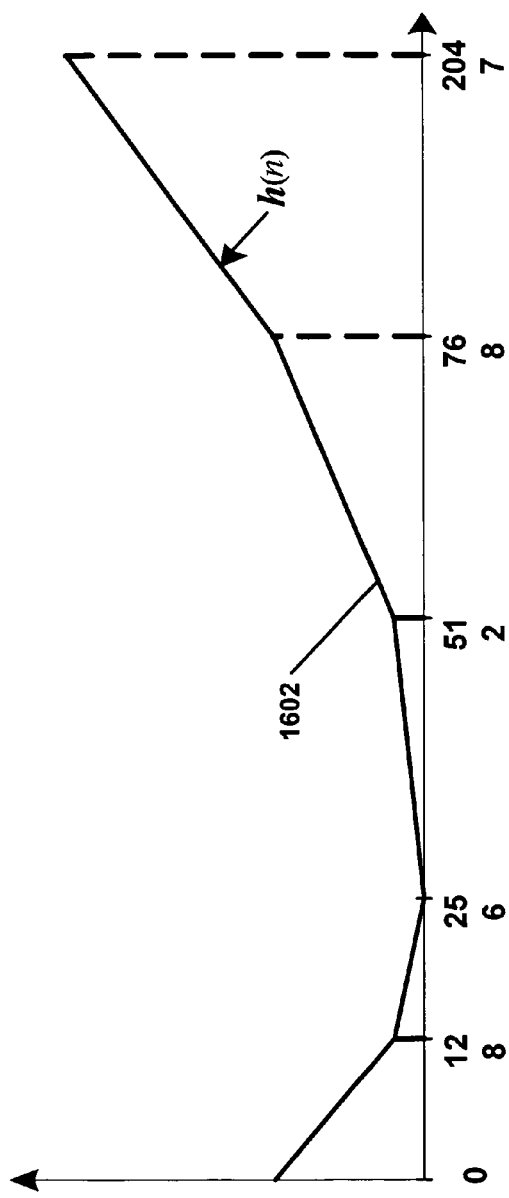
FIG. 16 illustrates a plot of a piece-wise energy density function according to a disclosed example.

According to one example, in order to reduce the complexity due to the calculation of the effective interference (EI) energy density function (i.e., h(n)), a "piece-wise" function as shown in FIG. 16 may be utilized. This piece-wise function 1602 approximates the more computationally complex function 700 shown in FIG. 7. In the example of the FIG. 16, the piece-wise function 1602, utilizes only five samples (e.g., n=0, 128, 256, 512, 768 and 2048) to define the function 1602. In this example, the channel estimate length is 2048 samples long, with the cyclic prefix being 512 samples long and the maximum channel length is L=768.

Figure 17:
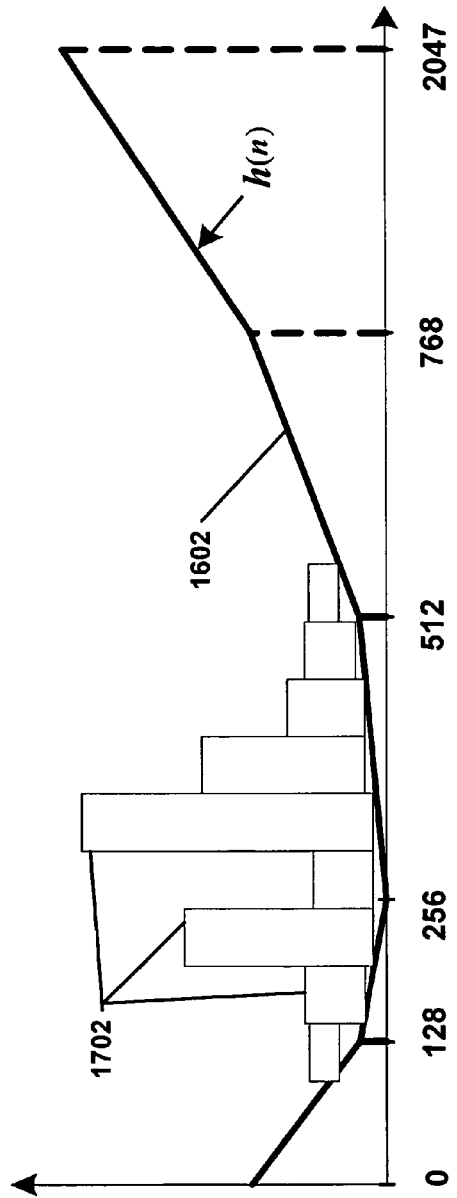
FIG. 17 illustrates an example of a binned mass profile according to a disclosed example.

FIG. 17, illustrates that to further reduce complexity of computations, the composite channel energy profile p(n) or m(n) can be divided into a number of bins 1702 at the expense of resolution. In particular, FIG. 17 illustrates the same concept as illustrated in FIGS. 9-11, except that portions of the profile are simply combined to yield a small number of samples (bins), which are then utilized to reduce the computational complexity. The piece-wise and binned profiles of FIGS. 16 and 17 may be utilized by the timing estimation circuit 1510, for example, to reduce the computation resources of the transceiver 1500, which may be implemented in an ASIC, for example.

Figure 18:
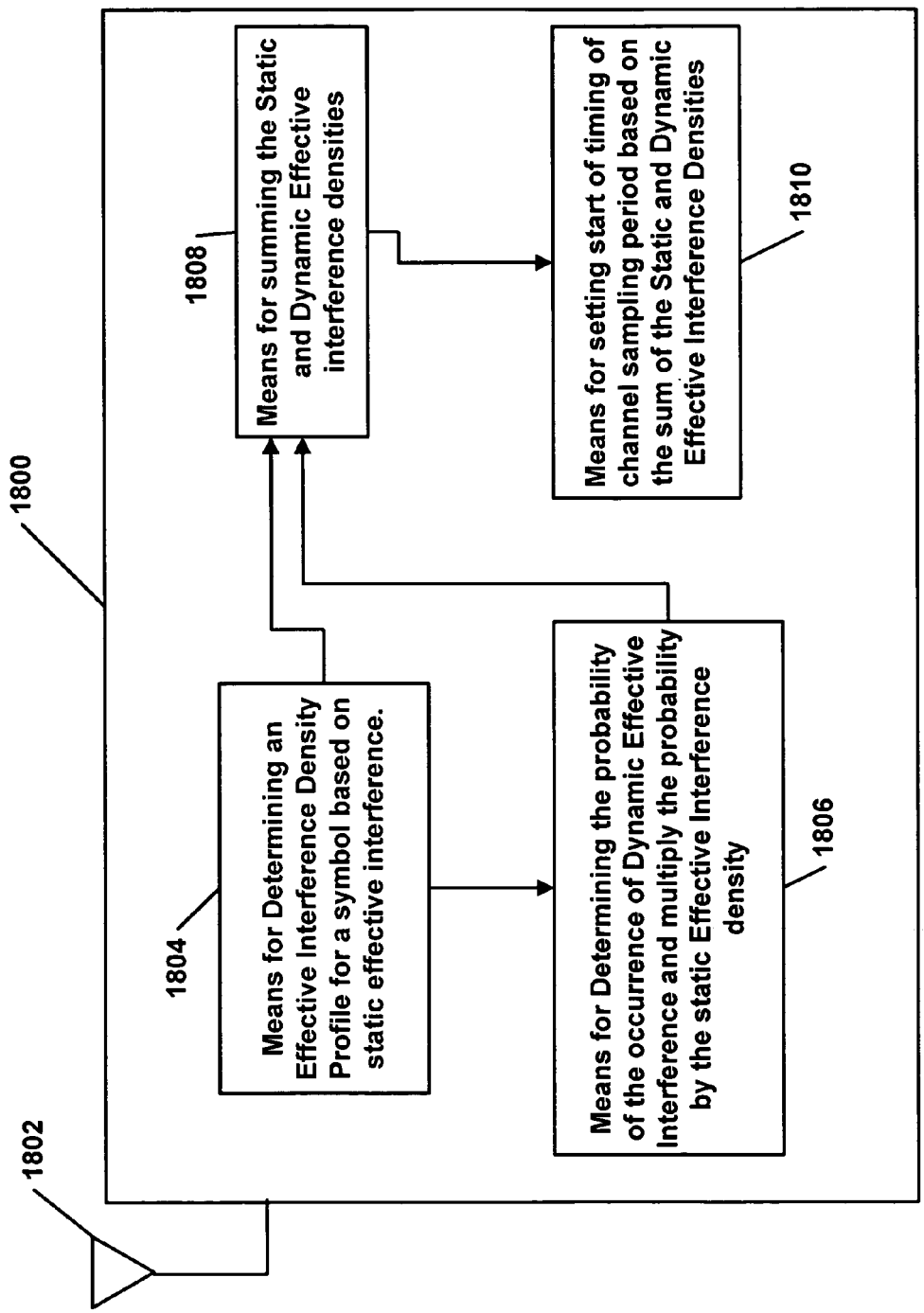
FIG. 18 illustrates a block diagram of another exemplary transceiver according to the present disclosure.

FIG. 18 illustrates a block diagram of another exemplary transceiver according to the present disclosure. As illustrated, a wireless transceiver 1800 includes an antenna 1802 for receiving and transmitting wireless communication signals. Within the device are various means for effecting the method disclosed in FIG. 8, as an example. In particular, the various means are used to effect the setting a start of timing of a channel sampling period by using at least the static and dynamic effective interference densities.

As shown in FIG. 18, means for determining an effective interference density profile 1804 is configured to determine the EI density profile based on a static EI. A resultant EI density profile is delivered to means for determining a probability of the occurrence of dynamic EI 1806. Means 1806 determines the probability (P) utilizing a Poisson probability model, as an example. Means 1806 also is configured to multiply the determined probability by the static EI density received from means 1804 to derive the dynamic EI density. Means 1806 sends the resultant dynamic EI density to means for summing 1808.

Means for summing 1808 receives the dynamic EI density from means 1806, as well as the static EI density from means 1804 and sums the two values. Means 1808 delivers the resultant sum to a means for setting a start of timing 1810. This means 1810 sets the start of timing based on the summed EI densities. As an example, the various means 1804, 1806, 1808 and 1810 may be effected by hardware, software or firmware. Further, these means could be implemented by the timing estimation circuit 1510 illustrated in FIG. 15, based on inputs from the channel estimator 1508.

Figure 19:
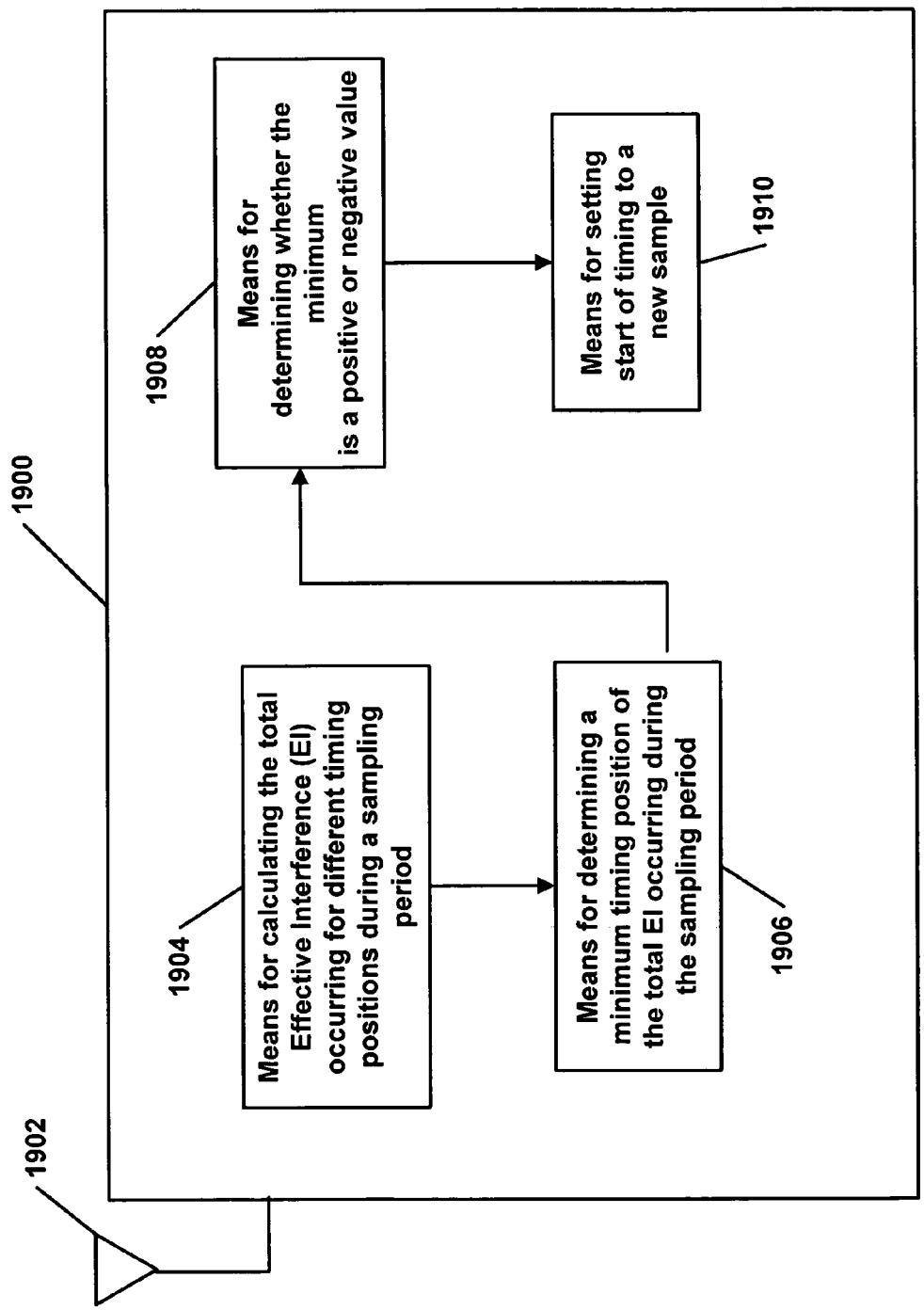
FIG. 19 illustrates a block diagram of yet another exemplary transceiver according to the present disclosure.

FIG. 19 illustrates a block diagram of yet another exemplary transceiver according to the present disclosure. As illustrated, a wireless transceiver 1900 includes an antenna 1902 for receiving and transmitting wireless communication signals. Within the device are various means for effecting the method disclosed in FIG. 12, as an example. In particular, the various means are used to effect the setting a start of timing to a new channel sampling period by using the total EI.

As shown, means for calculating a total effective interference (EI) density profile 1904 is included. This means 1904 calculates the total EI occurring for different timing positions during a particular sampling period. Means 1904 sends the resultant calculated total EI to a means for determine a minimum timing position of the total EI occurring during the sampling period. Means 1904 may effect the relationship in equation (8), as an example, to make this determination. The resultant value of the minimum timing position is sent by means 1906 to a means for determining whether the resultant minimum value is positive or negative 1908. The value of the minimum timing position, as well as the resultant indication of whether the value of positive or negative is sent to means 1910, which sets the start of timing to a new sample. It is noted that means 1910 is configured to set the start of timing to a new sample occurring later than a current sample set for start of timing if the value of the minimum timing position is a positive value. Conversely, means 1910 sets start of timing to a new sample occurring earlier than the current sample set for start of timing when the value of the minimum timing position is negative. As an example, the various means 1904, 1906, 1908 and 1910 may be effected by hardware, software or firmware. Further, these means could be implemented by the timing estimation circuit 1510 illustrated in FIG. 15, based on inputs from the channel estimator 1508.

Figure 20:
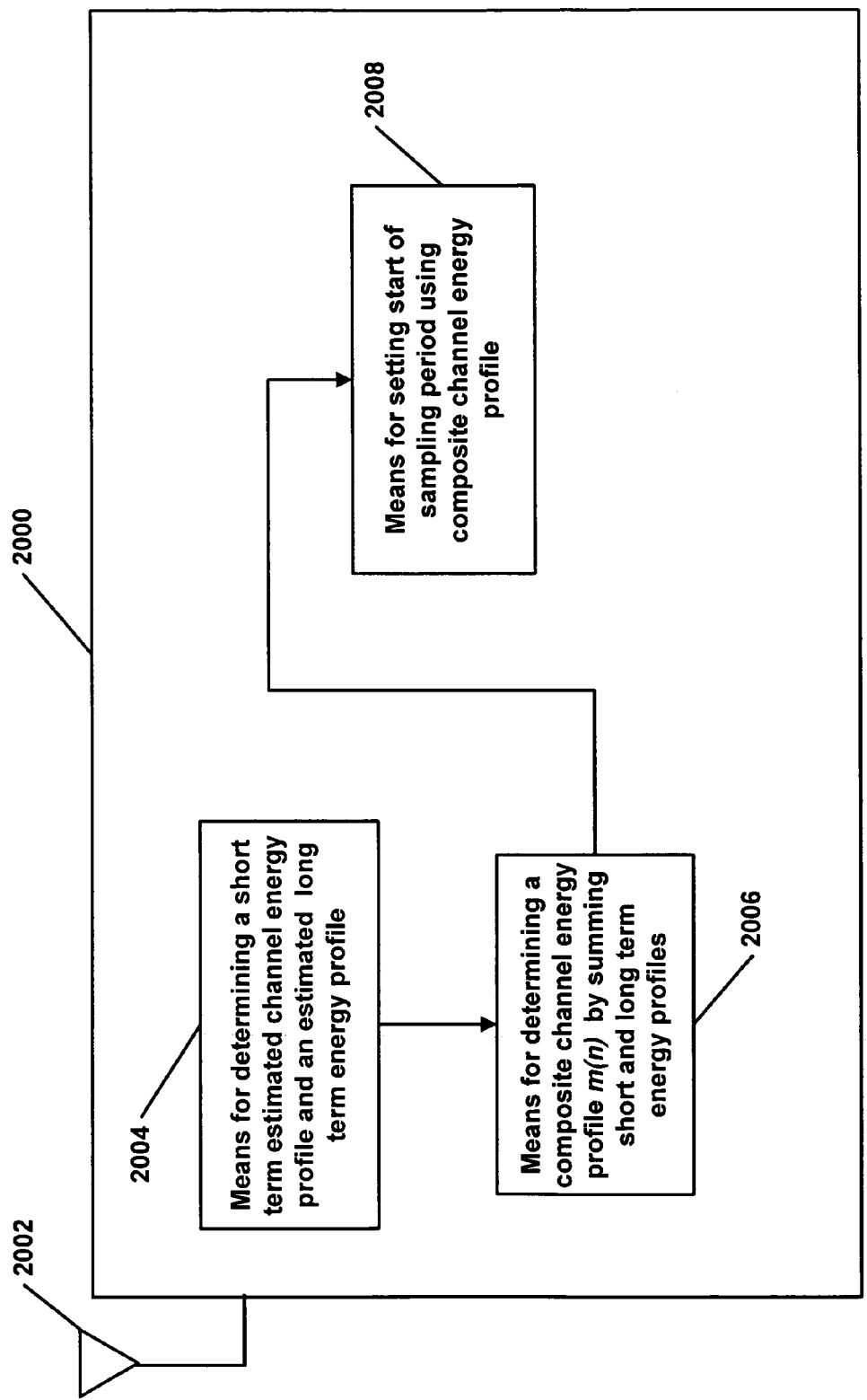
FIG. 20 is illustrates a block diagram of still another exemplary transceiver according to the present disclosure.

FIG. 20 is illustrates a block diagram of still another exemplary transceiver according to the present disclosure. As illustrated, a wireless transceiver 2000 includes an antenna 2002 for receiving and transmitting wireless communication signals. Within the device 2000 are various means for effecting the method disclosed in FIG. 13, as an example. In particular, the various means are used to effect the setting a start of timing of a channel sampling period by using at least the composite channel energy profile, such as that defined above by equations (4) or (9).

As shown in FIG. 20, means for determining a short term estimated channel energy profile and an estimated long term energy profile 2004 are included. This means 2004 may effect equations (2) and (3) above, as examples. Means 2004 sends the resultant long and short term channel energy profiles to a means 2006 for determining a composite channel energy profile (e.g., m(n)) by summing short and long term energy profiles, such as shown by equations (4) or (9) above. The determined composite energy profile is received by a means for setting start of sampling period using composite channel energy profile 2008. As an example, the various means 2004, 2006, and 2008 may be effected by hardware, software or firmware. Further, these means could be implemented by the timing estimation circuit 1510 illustrated in FIG. 15, based on inputs from the channel estimator 1508.

Figure 21:
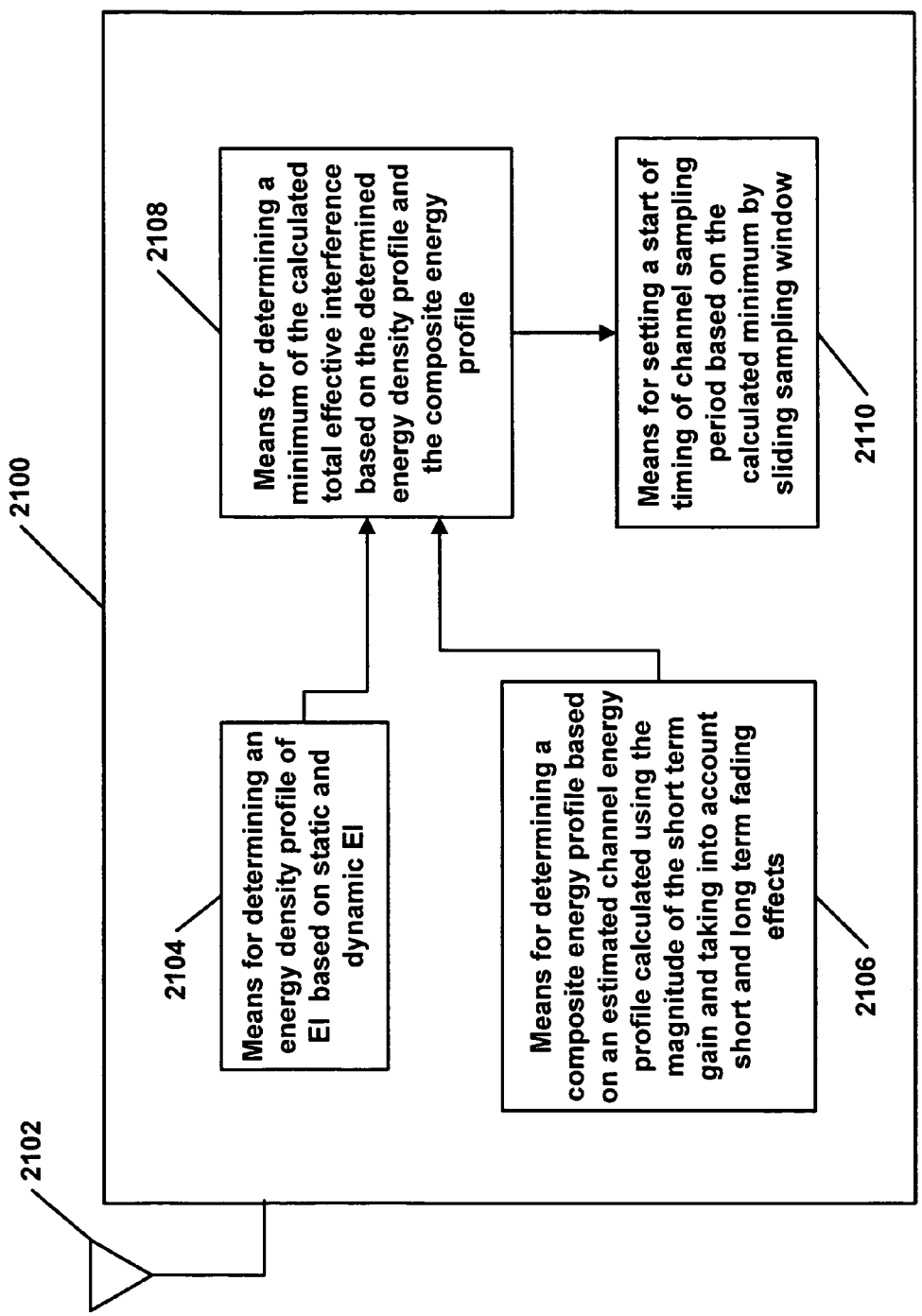
FIG. 21 is illustrates a block diagram of a further exemplary transceiver according to the present disclosure.

FIG. 21 is illustrates a block diagram of a further exemplary transceiver according to the present disclosure. As illustrated, a wireless transceiver 2100 includes an antenna 2102 for receiving and transmitting wireless communication signals. Within the device 2100 are various means for effecting the method disclosed in FIG. 14, as an example. In particular, the various means are used to effect the setting a start of timing of a channel sampling period by accounting for all three types of effective EI discussed previously.

FIG. 21 illustrates that transceiver 2100 includes a means 2104 for determining an energy density profile of effective interference (EI) based on the static and dynamic EIs. It is noted that means 2104 could be implemented by the various means illustrated in FIG. 18, as an example. Transceiver 2100 also includes a means 2106 for determining a composite energy profile based on an estimated channel energy profile calculated using the magnitude of the short term gain and taking into account short and long term fading effects. It is further noted that means 2106 could be implemented by the various means illustrated in FIG. 20, as an example.

Transceiver 2100 also includes a means 2108 for determining a minimum of the calculated total effective interference based on the determined energy density profile from means 2104 and the composite energy profile from means 2106. It is noted that this means 2108 could be implemented by at least some of the various means illustrated in FIG. 19, as an example. Moreover, means 2108 may utilize the relationship of equations (5) or (8) above to determine the minimum or "equilibrium." The determined minimum is sent by means 2108 to a means 2110, which sets the start of a timing of a channel sampling period based on this calculated minimum. Means 2110 may set the start of timing by "sliding" the sampling window to ensure that the timing offset corresponds with the determined minimum. As an example, the various means 2104, 2106, 2108 and 2110 may be effected by hardware, software or firmware. Further, these means could be implemented by the timing estimation circuit 1510 illustrated in FIG. 15, based on inputs from the channel estimator 1508.

In summary, the disclosed methods and apparatus provide a simple, but effective way to maintain a balance among four factors when determining an accurate start of timing. That is, the balance between the "static EI" and "dynamic EI", as well as the balance between the long-term channel behavior and the short term channels activity. It is also noted that the exemplary methods for determining symbol timing discussed above may be used singularly or in combination with each other, such as in the example of FIG. 8.

The methods or algorithms described in connection with the examples disclosed herein may be embodied directly in hardware, in a software module executed by a processor, firmware, or in a combination of two or more of these. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The examples described above are merely exemplary and those skilled in the art may now make numerous uses of, and departures from, the above-described examples without departing from the inventive concepts disclosed herein. Various modifications to these examples may be readily apparent to those skilled in the art, and the generic principles defined herein may be applied to other examples, e.g., in an instant messaging service or any general wireless data communication applications, without departing from the spirit or scope of the novel aspects described herein. Thus, the scope of the disclosure is not intended to be limited to the examples shown herein but is to be accorded the widest scope consistent with the principles and novel features disclosed herein. The word "exemplary" is used exclusively herein to mean "serving as an example, instance, or illustration." Any example described herein as "exemplary" is not necessarily to be construed as preferred or advantageous over other examples. Accordingly, the novel aspects described herein is to be defined solely by the scope of the following claims.

What is claimed is:

1. A method for setting timing of sampling of one or more symbols comprising:
    determining by a transceiver an energy density profile of effective interference occurring in at least symbol based on static intersymbol interference and dynamic effective interference;
    determining an estimated channel energy profile of the at least one symbol based on the magnitude of the gain at one or more samples;
    calculating a composite channel energy profile of at the least one symbol based on the estimated channel energy profile and including a summation of a short term channel energy profile and a long term channel energy profile accounting for channel fading;
    determining a total effective interference energy profile by multiplying the energy density profile and the composite channel energy profile for one or more samples;
    determining a minimum of the calculated total effective interference energy profile over a predetermined sampling period; and
    setting a start of timing of the symbol for a subsequent sampling period based on the calculated minimum of the total intersymbol interference energy profile.

2. The method as defined in claim 1, wherein setting the start of the timing includes sliding a sampling window responsive to the determined minimum to ensure that a sample where the minimum occurs is set as the start of timing.

3. The method as defined in claim 2, further comprising:
    determining whether the determined minimum is one of a positive number and a negative number;
    setting the start of timing to a new sample occurring later than a current sample when the determined minimum is positive; and
    setting the start of timing to a new sample occurring earlier than the current sample when the determined minimum is negative.

4. The method as defined in claim 1, wherein the symbol is configured according to orthogonal frequency division multiplexing (OFDM).

5. A computer readable medium having instructions stored thereon, the stored instructions, when executed by a processor, cause the processor to perform a method for setting timing of sampling of one of more symbols, the method comprising:
- determining an energy density profile of effective interference occurring in at least symbol based on static intersymbol interference and dynamic effective interference;
- determining an estimated channel energy profile of the at least one symbol based on the magnitude of the gain at one or more samples;
- calculating a composite channel energy profile of at the least one symbol based on the estimated channel energy profile and including a summation of a short term channel energy profile and a long term channel energy profile accounting for channel fading;
- determining a total effective interference energy profile by multiplying the energy density profile and the composite channel energy profile for one or more samples;
- determining a minimum of the calculated total intersymbol interference energy profile over a predetermined sampling period; and
- setting a start of timing of the symbol for a subsequent sampling period based on the calculated minimum of the total intersymbol interference energy profile.

6. The computer readable medium as defined in claim 5, wherein the stored instructions, when executed by a processor, cause the processor to further perform setting the start of the timing includes sliding a sampling window responsive to the determined minimum to ensure that a sample where the minimum occurs is set as the start of timing.

7. The computer readable medium as defined in claim 6, wherein the stored instructions, when executed by a processor, cause the processor to further perform:
- determining whether the determined minimum is one of a positive number and a negative number;
- setting the start of timing to a new sample occurring later than a current sample when the determined minimum is positive; and
- setting the start of timing to a new sample occurring earlier than the current sample when the determined minimum is negative.

8. The computer readable medium as defined in claim 5, wherein the symbol is configured according to orthogonal frequency division multiplexing (OFDM).

9. An apparatus for setting timing of sampling of one or more symbols in a wireless device comprising:
- means for determining an energy density profile of effective interference occurring in at least symbol based on static intersymbol interference and dynamic effective interference;
- means for determining an estimated channel energy profile of the at least one symbol based on the magnitude of the gain at one or more samples;
- means for calculating a composite channel energy profile of at the least one symbol based on the estimated channel energy profile and including a means for summing a short term channel energy profile and a long term channel energy profile to account for channel fading;
- means for determining a total effective interference energy profile by multiplying the energy density profile and the composite channel energy profile for one or more samples;
- means for determining a minimum of the calculated total effective interference energy profile over a predetermined sampling period; and
- means for setting a start of timing of the symbol for a subsequent sampling period based on the calculated minimum of the total effective interference energy profile.

10. The apparatus as defined in claim 9, wherein the means for setting the start of the timing includes means for sliding a sampling window responsive to the determined minimum to ensure that a sample where the minimum occurs is set as the start of timing.

11. The apparatus as defined in claim 9, further comprising:
- means for determining whether the determined minimum is one of a positive number and a negative number;
- means for setting the start of timing to a new sample occurring later than a current sample when the determined minimum is positive; and
- means for setting the start of timing to a new sample occurring earlier than the current sample when the determined minimum is negative.

12. The apparatus as defined in claim 9, wherein the symbol is configured according to orthogonal frequency division multiplexing (OFDM).

* * * * *

UNITED STATES PATENT AND TRADEMARK OFFICE

CERTIFICATE OF CORRECTION

| | | |
|---|---|---|
| PATENT NO. | : 7,623,607 B2 | Page 1 of 1 |
| APPLICATION NO. | : 11/264532 | |
| DATED | : November 24, 2009 | |
| INVENTOR(S) | : Vrcelj et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 836 days.

Signed and Sealed this

Fourteenth Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,623,607 B2 | Page 1 of 1 |
| APPLICATION NO. | : 11/264532 | |
| DATED | : November 24, 2009 | |
| INVENTOR(S) | : Vrcelj et al. | |

It is certified that error appears in the above-identified patent and that said Letters Patent is hereby corrected as shown below:

On the Title Page:

Delete Item (12) insert Item --(12) Wang et al.--

The Inventors item (75) should read:

Michael M. Wang
    Bojan Vrcelj
    Fuyun Ling

Signed and Sealed this
Twenty-ninth Day of November, 2011

David J. Kappos
*Director of the United States Patent and Trademark Office*